2,999,839
STABILIZATION OF ELASTOMERS CONTAINING UREYLENE GROUPS
Harold C. Arvidson, Jr., Wilmington, Del., and Norman Blake, Chadds Ford, Pa., assignors to E. I. du Pont de Nemours and Company, Wilmington, Del., a corporation of Delaware
No Drawing. Filed Jan. 17, 1958, Ser. No. 709,445
14 Claims. (Cl. 260—45.9)

This invention relates to the stabilization of elastomeric polymers containing aromatic ureylene residues.

An outstanding obstacle to the use of elastomeric fibers in wearing apparel, upholstery fabrics, rug piles, and other uses has been the tendency of elastomers heretofore available to turn yellow and degrade upon exposure to light or fumes. A type of elastomer which has shown, relative to its precursors, improved stability on exposure to ultraviolet light and improved retention of its mechanical and elastic properties, is the subject of copending application S.N. 556,071, now U.S. Patent No. 2,957,907 (Frankenburg & Frazer: "Elastomers Derived from Hydrazine"). These elastomers have the mechanical properties necessary to fulfill the needs of the textile industry for an elastic fiber; however, for many end uses they still lack adequate stability against yellowing and loss of mechanical properties on exposure to ultraviolet light, especially when it is desired to use them in the lower denier ranges, or in the uncovered state. Fibers prepared from these elastomers also yellow strongly under the action of the gaseous combustion products of hydrocarbon fuels. Another shortcoming of these elastomers is their tendency to turn yellow while in solution, particularly when the solution is hot. Since the elastomers are formed into fibers by extrusion into a hot gaseous or liquid medium, the fibers so produced tend to be appreciably off-white.

Accordingly, it is an object of this invention to provide a means for stabilizing fibers prepared from aromatic ureylene-containing elastomers against development of color by the action of light and fumes. It is also an object to stabilize the mechanical properties of these fibers against the action of light. A further object is to produce from these elastomers fibers of excellent initial whiteness.

These objects are accomplished by incorporating within a shape article between 1 and 15% by weight of a compound selected from the group consisting of an aliphatic amine and a titanium dioxide pigment, the said shaped article being formed from an elastomeric polymer comprising aromatic ureylene residues.

In an especially valuable embodiment of the invention both a titanium dioxide pigment and an aliphatic amine are present in the shaped article. The phrase "aliphatic amine" is meant to exclude amines wherein the nitrogen is bonded directly to an aromatic nucleus. It includes primary, secondary, and tertiary amino nitrogen, which, when the compound is polymeric, may be in the main chain, or attached to the main chain or attached to side chains. It includes branched structures such as the non-aromatic amino resins. In the case of a urea-formaldehyde resin, only one of the two nitrogens attached to the carbonyl group is considered to behave as amino nitrogen, the other being amido in nature. (Cf. "Synthetic Resins and Allied Plastics," ed. R. S. Morrell, 3rd edition, Oxford University Press, 1951, p. 188.) It is preferred that branching not be so great as to render the stabilizer insoluble, inasmuch as the amino group is most effective in protecting the elastomeric polymer when it is molecularly dispersed therein, and such a molecular dispersion is best achieved by removal of solvent from a co-solution of polymer and stabilizer.

The polymers to which this invention is applicable are ureylene-containing linear, segmented elastomers comprising alternating soft and hard segments. By "soft segment" is meant the divalent organic radical remaining on removal of terminal hydroxyl groups from a hydroxyl terminated polymer melting below 60° C. and having a second order transition below room temperature. By "hard segment" is meant a divalent organic radical whose melting point would be greater than 250° C. if it were part of a homopolymer of fiber-forming molecular weight. These elastomers are conveniently prepared by reacting, for example, a poly(alkylene oxide) glycol or a polyester such as polyethylene adipate with an aromatic diisocyanate. Molecules thus prepared with isocyanate-terminated chains are then reacted with a diamine or hydrazine. Such a polymer may be represented by the formula:

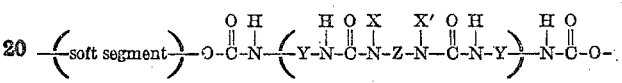

The radical in the second set of parentheses represents the hard segment, wherein —Y— signifies an aromatic residue, such as the methylene bis(4-phenyl) radical; X— and X'— signify hydrogen or monovalent organic substituents; and —Z— signifies an alkylene radical such as —(CH$_2$)$_n$—, wherein $n$ is an integer including zero. These polymers are conveniently prepared as solutions by carrying out the final step of polymerization in a high dipole organic solvent such as N,N-dimethylformamide, N,N-dimethylacetamide, N-methyl pyrrolidone, dimethylsulfoxide, tetramethylene sulfone, or the like.

In the particular elastomers with which this invention is concerned, the hard segment in each case contains an aromatic ureylene residue, the radical in parentheses in the following formula:

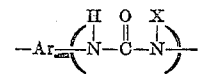

where Ar represents an aromatic nucleus and X-represents hydrogen or a monovalent organic radical. Normally the elastomer will be composed of between 1 and 10% by weight of such ureylene residues.

Hard segments comprising aromatic ureylene residues are especially advantageous because, owing to their very high melting points, they lead to elastomers with excellent tenacity, elongation, stress decay, and tensile recovery properties. However, fibers prepared from elastomers containing the ureylene linkage are susceptible to the degradative action of both ultraviolet light and fumes.

The stabilizing compounds, titanium dioxide or aliphatic amine, may be added to a solution of the ureylene-containing elastomer. These compounds are effective when either one is present independently of the other, but in a preferred embodiment of the invention, both titanium dioxide and an aliphatic amino compound are present. The titanium dioxide should be of a pigment grade and should be present in a concentration between 1 and 15% based on the weight of the polymer to be stabilized. Examples of suitable amines are poly(N,N-diethyl-beta-aminoethyl methacrylate), referred to hereafter as DEAM, polyethylene imine, and dihydroabietyl amine, a technical grade of which is available commercially as "Rosin Amine D."

If a tertiary amine is used, the amine (as well as the titanium dioxide) may be present during the chain extension of the elastomer.

The elastomer will normally contain between about 1% and 10% by weight of ureylene residues. Stabilizing substances containing relatively high percentages of amino nitrogen may be present in relatively smaller amounts than substances containing only low percentages of amino nitrogen. For example, DEAM, with a molecular weight per repeating amino unit of 186, is a better stabilizer on a weight basis than "Rosin Amine D" with a molecular weight of 285.

The following example illustrates a preferred embodiment of the invention, showing the range of concentrations of stabilizers which are effective in protecting the elastomer against the action of light, heat, and fumes. The exposure to ultraviolet light is carried out in a Fade-Ometer, a testing instrument made by the Atlas Electric Devices Company, described in Standard Test Method 16A–56 in the Technical Manual and Yearbook of the American Association of Textile Chemists and Colorists, vol. 32 (1956), page 86. The exposure is made to a Pyrex-enclosed carbon arc, 14% of the light from which is in the ultraviolet region of 3000 to 4300 Angstroms. The samples are placed a distance of 8 inches from the light source. The fume-fading tests are made in a chamber similar to that described on pages 90 and 91 of the aforesaid technical manual. The combustion fumes supplied to the cabinet are generated by a Meker laboratory burner supplied with gas at the rate of 2.0 cubic feet per hour. The temperature of the chamber is held at 60° C.

The "percent yellow" is measured on a colorimeter. It is given by the expression:

$$\text{Percent yellow} = 100 - 100\left(\frac{B}{R+G+B}\right) \bigg/ \left(\frac{B_s}{R_s+G_s+B_s}\right)$$

where B, R, G represent the colorimeter readings for light reflected from a yarn sample and filtered respectively through blue, red, and green filters. $B_s$, $R_s$, and $G_s$ are the corresponding values for a standard white reference plate used to zero the instrument. A value of less than 16% yellow is considered good. At about 16%, the yellow becomes perceptable to the eye. The "color break" which occurs at 16% yellow has been found to be distinct enough that in some cases, the colorimeter may be dispensed within the interest of rapid testing. When visual examination alone is relied upon, the number of exposure hours until appearance of slight color is taken as the measure of degree of stability.

EXAMPLE I 92 parts of polytetramethylene ether glycol (0.092 mole) of molecular weight 1000 are reacted with 8 parts (0.046 mole) of 2,4-tolylene diisocyanate under an atmosphere of nitrogen for 3 hours at 80° C. The product of this reaction, in which polyether glycol chains are coupled one or more times by diisocyanate molecules, is called "dimer." 40 parts of the dimer (.02 mole) are reacted with 10 parts (.04 mole) of bis-(4-isocyanatophenyl) methane for one hour at 80° C. and diluted with 25 parts of N,N-dimethylformamide. The product of this reaction, in which terminal isocyanate groups are placed at the end of each dimer molecule, is called "capped dimer." 15 parts of the diluted capped dimer is "chain extended" by pouring into 0.165 parts (.0033 mole) of hydrazine hydrate in 30 parts of dimethylformamide. The solution of elastomeric polymer so produced contains approximately 20% solids, is of 400 to 500 poises viscosity at 30° C., and has an inherent viscosity in hexamethyl phosphoramide of 1.3 to 1.6.

Titanium dioxide dispersions are prepared as 50% slurries in dry dimethylformamide. Titanium dioxide is ball milled in the solvent for a minimum of 12 hours, and the dispersion is kept in suspension by constant agitation prior to use. The titanium dioxide should be of pigment grade, containing at least about 95% titanium dioxide. The material used in this experiment is "Ti-pure" R-610, a titanium dioxide pigment which converts on calcination to the rutile crystalline form, and which contains small amounts of zinc oxide, alumina, silica, and hydrous titania.

The amine stabilizer used in this experiment is a polymer of N,N-diethyl beta-aminoethyl methacrylate. Polymerization can be conveniently carried out in dimethylformamide solution, resulting directly in a solution which is 65% by weight of the polymeric amine.

After the dispersion of titanium dioxide and the solution of polymeric amine have been added to the polymer solution in the desired quantities, the solution is stirred until homogeneous and then heated to a temperature of 50 to 70° C. and spun as a 15 filament yarn into a 17-foot dry spinning column heated with air at 250° C. The time between heating and extrusion of this solution is held to less than 1 minute. At the bottom of the dry spinning column, the filaments are allowed to come into contact and coalesce to give a monofilament of about 300 to 400 denier. Upon emergence from the dry spinning column, the monofil is coated with talc to prevent sticking on the spinning package. The talc is removed by a 30-minute boil-off prior to testing. Samples exposed to ultraviolet light are wound on a 3 x 7-inch aluminum plate. Two-gram skeins of the monofil are used for fume exposure. Table I shows the effect of exposure of various compositions to fumes and ultraviolet light. The percentages of pigment and amine are based on the weight of elastomer.

*Table I*

| Percent R-610/percent DEAM | Percent yellowness | | 32 hours U.V.[2] | As spun [1] | | 32 hours U.V.[2] | |
|---|---|---|---|---|---|---|---|
| | As spun | 16 hours fumes [2] | | Ten. g./den. | Elong. percent | Ten. g./den. | Elong. percent |
| 0/0 | 31.1 | 46.4 | 34.1 | 1.08 | 740 | 0.11 | 276 |
| 0/5 | 22.5 | 27.0 | 18.2 | 0.93 | 721 | 0.49 | 620 |
| 2/5 | 18.8 | 20.9 | 9.3 | 1.02 | 767 | 0.88 | 620 |
| 5/5 | 11.9 | 18.3 | 6.5 | 0.94 | 732 | 0.87 | 652 |
| 8/5 | 9.4 | 15.6 | 4.8 | 0.83 | 748 | 0.81 | 650 |
| 16/5 | 8.6 | 15.6 | 4.9 | 0.64 | 711 | 0.58 | 568 |

[1] As-spun properties on boiled-off monofil.
[2] Boiled off prior to testing in fumes, U.V.

The effect achieved by the combination of amine and pigment is especially well illustrated by the (0/5) and (2/5) compositions of the above table. The addition of only 2% of pigment, when 5% of the amine is already present, reduces the yellowing on exposure to UV light by half while increasing the residual tenacity by 80%. It is because of this synergistic effect that a composition containing both pigment and amine as stabilizers is preferred.

The effect of using a preferred amine (DEAM) in combination with various types of titanium dioxide pigment is shown in the next example.

EXAMPLE II

A polymer solution having an inherent viscosity of 1.74 and 19% solids concentration is prepared according to the procedure of Example I. To 3175 parts of this solution are added 60.5 parts of a 50% titanium dioxide slurry and 47 parts of a 65% solution of DEAM. The resultant solution is spun as in Example I to give 300-denier monofilaments which contain 5% of titanium dioxide and 5% of DEAM, based on the weight of polymer. These filaments are subjected to ultraviolet and fume tests with the results shown in Table II.

While the magnitude of the stabilizing effect varies somewhat with the nature of the titanium dioxide, all varieties of pigment give fibers with strikingly improved properties. This can also be seen from Table III, wherein the monofilaments each contain 15% of the pigment but no amine. Samples containing equivalent amounts of zirconia and zinc titanate are shown for purposes of comparison. These did not stabilize the polymer.

Table II

| Spin. No. | Grams 50% TiO₂ slurry | As spun | Percent yellowness | | As spun [1] | | 32 hours U.V. [2] | |
|---|---|---|---|---|---|---|---|---|
| | | | 16 hours fumes [2] | 32 hours U.V. [3] | Ten. g./den. | Elong. percent | Ten. g./den. | Elong. percent |
| E-57-132 | DEAM only | 22.5 | 27.0 | 18.2 | 0.93 | 721 | 0.49 | 620 |
| E-57-133 | 60.5 "Ti-Pure" R-610 [3] | 8.1 | 22.2 | 9.7 | 0.73 | 589 | 0.74 | 609 |
| E-57-134 | 60.5 "Ti-Pure" 5-510 [4] | 8.5 | 20.5 | 22.2 | 0.72 | 582 | 0.74 | 609 |
| | 60.5 "Ti-Pure" 33 [5] | 11.0 | 25.5 | 11.4 | 0.75 | 582 | 0.71 | 627 |

[1] As-spun properties on boiled-off monofil.
[2] Boiled off prior to testing in fumes, U.V.
[3] "Ti-Pure" R-610—A titanium dioxide pigment which converts on calcination to the rutile crystalline form, and which contains small amounts of zinc oxide, alumina, silica, and hydrous titania.
[4] "Ti-Pure" R-510—Similar to R-610, but containing no zinc oxide.
[5] "Ti-Pure" 33—An anatase form of the titanium dioxide containing a small amount of antimony oxide.

Note.—Pigments are obtainable from E. I. du Pont de Nemours and Co., Pigments Department.

Table III

| | Tenacity (grams per denier)/elongation (percent) Fade-Ometer exposure, hours | |
|---|---|---|
| | 0 | 20 |
| Control (no pigment) | 0.25/450 | (¹) |
| Zinc titanate | 0.19/470 | (¹) |
| Zirconia | 0.20/430 | (¹) |
| "Ti-Pure" R-610 | 0.25/453 | 0.22/426 |
| "Ti-Pure" R-110 [2] | 0.28/381 | 0.14/333 |
| "Ti-Pure" R-510 | 0.26/423 | 0.11/245 |

[1] Too weak to test. Tenacity less than 0.04 g.p.d.
[2] "Ti-Pure" R-110—a rutile pigment containing a small amount of alumina The preservation of good mechanical properties upon exposure to U.V. light which is demonstrated in the above examples for the compositions of the present invention, is of critical importance for compositions which are to be used in stress-bearing structures such as fibers and films.

The effectiveness of other amines as stabilizers is illustrated in the following Examples III–VI.

EXAMPLE III

To a 20% solution of elastomer, prepared as in Example I, is added a 50% solids solution of poly-N,N-dimethyl beta-aminoethyl methacrylate (DMAM) in dimethylformamide, having a viscosity of 5.5 poises. Following the procedure of Example I, 5% "Ti-Pure" R-610 is added as a 50% slurry. Fibers spun from the resultant solution are subjected to fume tests, with the results shown in Table IV.

Table IV

| Percent DMAM added to polymer | Percent yellowness after 16 hours fume exposure |
|---|---|
| 0.0 (TiO₂ only) | 34 |
| 4.8 | 21 |
| 6.8 | 20 |
| 8.8 | 19 |

EXAMPLE IV

To 3180 parts of the polymer solution prepared in Example II are added 30.2 parts of "Rosin Amine D" (dihydroabietyl amine) and 60.5 parts of titanium dioxide pigment "Ti-Pure" R-610 (50% slurry). The fibers spun from the resultant solution contain 5% of the pigment and 5% of the amine, based on the weight of polymer. On exposure to fumes and ultraviolet light, the fibers have the following properties in comparison with a control.

Table V

| Percent TiO₂/percent amine | As spun | Percent yellowness | |
|---|---|---|---|
| | | 16 hrs. Fumes [1] | 32 hrs. U.V. [1] |
| 5/5 | 7.4 | 11.0 | 19.4 |
| 0/0 | 31.1 | 46.4 | 34.1 |

[1] Boiled off prior to testing in fumes, U.V.

The remarkable improvement in as-spun color in the above example illustrates the enhanced thermal stability of the compositions of this invention.

EXAMPLE V

Polymer solution prepared as in Example I is modified by adding 1.2% of polyethyleneimine (as a 50% aqueous solution). Films are then cast as in Example VI.

Exposure of these films to ultraviolet light and gas fumes show good color inhibition compared to unmodified films as summarized in Table VI.

Table VI

| Percent | Modification | As cast | Percent yellowness | |
|---|---|---|---|---|
| | | | 16 hrs. fumes | 16 hrs. U.V. |
| 5/5 | DEAM/"Ti-Pure" R-610 | 4.6 | 5.6 | 6.1 |
| 1.2/5 | Polyethyleneimine/"Ti-Pure" R-610 | 4.8 | 7.8 | 8.8 |
| 0/0 | Control | 5.2 | 23.0 | 15.4 |

EXAMPLE VI 30 parts of urea are dissolved in 150 parts of formalin and 260 parts of butyl alcohol. The mixture is stirred while refluxing at 105° C. for 1 hour. The product is cooled and adjusted to a pH of 6.9 with aqueous sodium carbonate. Water is removed from the resin mixture by addition of toluene and distillation. After all water is removed, the varnish is made up to a solids content of 20% with toluene and has a viscosity of 2 poises. 5 parts of this solution are added to 95 parts of a polymer solution prepared as in Example I. To this are added 10 parts of a 50% dispersion of "Ti-Pure" R-610 titanium dioxide pigment. The resultant dispersion containing 5% pigment and 5% of the resin, based on polymer content, is cast onto a glass plate with a 5-mil doctor knife. The resultant film upon drying has a thickness of 1 mil. It is tested for stability to fumes and ultraviolet light, with the results given in Table VII.

Table VII

| Films | 5% R-610 TiO₂ only | 5% R-610 TiO₂, 5% butylated urea-formaldehyde |
|---|---|---|
| As cast | 5.2 | 3.5 |
| 16 hours fumes | 14.2 | 6.1 |
| 18 hours U.V. | 14.1 | 6.1 |

The following examples illustrate the stabilization of alternate types of polymer.

EXAMPLE VII

Three moles of dry poly(tetramethylene ether) glycol having an average molecular weight of approximately 1000 is reacted with 2 moles of 2,4-tolylene diisocyanate by heating for 3 hours on the steam bath under nitrogen. A low molecular weight polymer having hydroxyl end groups and containing an average of 3 poly(tetramethylene ether) groups per molecule is obtained. 48.4 grams (0.014 mole) of this "trimer" is reacted under nitrogen with 6.1 grams (0.030 mole) of 2,4,6-trimethyl-1,3-phenylene diisocyanate in 30 ml. of xylene for 2 hours at 125–130° C. A trimer terminated with isocyanate groups is thereby produced. The solvent is removed under reduced pressure and the residue is dissolved in 150 ml. of N,N-dimethylacetamide. To this solution at 0° C. is added a solution of 0.75 (0.015 mole) grams of hydrazine hydrate in 15 ml. of dimethylacetamide. The solution is allowed to warm to room temperature with stirring. The polymer solution thus prepared contains 25% solids.

To this elastomer solution are added 6.8% DEAM and 5% titanium dioxide. For many purposes an elastomer with a photostability of better than 75 hours in the the Fade-Ometer and better than 15 hours in the fume cabinet would be satisfactory. In order to determine the minimum proportion of titanium dioxide required to achieve this end, elastomer films stabilized with varying amounts of DEAM and titanium dioxide are subjected to fume and Fade-Ometer tests. The data in Table VIII indicate that a titanium dioxide concentration of only 1% is sufficient for these purposes when accompanied by 6.8% of DEAM.

Table VIII

| Additive(s) and concentration(s) | Hours exposure necessary for— | |
|---|---|---|
| | Fume color break | Photo color break |
| None | 15 | 4 |
| 6.8% DEAM alone | >15 | <40 |
| 5% R-610 TiO₂ alone | >15 | <40 |
| 5% R-610 TiO₂ + 6.8% DEAM | >15 | >114 |
| 2½% R-610 TiO₂ + 6.8% DEAM | >15 | >114 |
| 1% R-610 TiO₂ + 6.8% DEAM | >15 | 114 |

EXAMPLE VIII

To 40 grams of poly(tetramethylene oxide) glycol dimer, prepared as in Example I are added 10 grams of methylene bis(4-phenyl isocyanate). The mixture is heated and stirred for one hour on a steam bath at 85° C. 150 ml. of dimethylformamide are added, the mixture is cooled to 0° C., and 2.32 grams of N,N'-diamino piperazine in 50 ml. of dimethylformamide are added. To solutions, as prepared above, are added DEAM and "Ti-Pure" R-610 titanium dioxide. The solutions are then spun in the conventional manner, and the fibers are submitted to Fade-Ometer and fume-fading tests as before. The results are presented in Table IX.

Table IX

| Additive | Fiber stick temp., °C. | Tenacity g.p.d. | Elong. percent | Percent yellow in Fade-Ometer after 18 hrs. | Fume-fade hrs. to color/break |
|---|---|---|---|---|---|
| None | 155 | .75 | 720 | 22 | 4 |
| 5% TiO₂ | 160 | .64 | 625 | 18 | 6 |
| 6.8% DEAM | 160 | .64 | 680 | 18 | 6 |
| Both | 155 | .68 | 620 | 16 | 20 |

EXAMPLE IX 300 grams of a copolyester prepared from ethylene glycol, propylene glycol and adipic acid with a molecular weight of 2820 and 53 grams of methylene bis(4-phenylisocyanate) are heated at 95° C. for two hours under nitrogen, with stirring. After cooling to room temperature, the prepolymer is diluted with 176 grams of dry dimethylformamide. The diluted prepolymer is then added with stirring to 1235 grams of dry dimethylformamide containing 5.3 grams of hydrazine hydrate. The polymer solution so formed has a solids content of 25%, a viscosity of 80 poises, and an inherent viscosity of 1.11 in hexamethyl phosphoramide.

To a sample of the above solution are added 5% of "Ti-Pure" R-610 titanium dioxide as a 50% dispersion in dimethylformamide and 5% of DEAM as a 65% solution, the percentages being based on the weight of polymer. 1 mil thick films are cast from this solution and from a solution containing no additives.

Protection of color and mechanical properties on exposure to ultraviolet light is demonstrated by the yellowness figures and mechanical property values in Table X.

Table X

AS-CAST

| Percent DEAM/ percent TiO₂ | Percent yellowness | Film weight (denier) | Film tenacity (g.p.d.) | Elong. percent |
|---|---|---|---|---|
| 0/0 | 6.0 | 1,628 | 0.23 | 750 |
| 5/5 | 8.0 | 2,001 | 0.23 | 745 |

AFTER 16 HRS. U.V.

| Percent DEAM/ percent TiO₂ | Percent yellowness | Film weight (denier) | Film tenacity (g.p.d.) | Elong. percent |
|---|---|---|---|---|
| 0/0 | 67.8 | 1,701 | 0.06 | 229 |
| 5/5 | 35.3 | 1,976 | 0.16 | 519 |

EXAMPLE X

To 500 grams of poly(tetramethylene oxide) glycol dimer prepared as in Example I are added 10 grams of N-methyl diethanolamine and 167 grams of methylene bis(4-phenylisocyanate). The mixture is stirred and heated under nitrogen on the steam bath at 80° C. for one hour. The mixture is cooled to room temperature; 335 ml. of dimethylformamide are added. A mixture of 10 ml. of hydrazine hydrate in 1940 ml. of dry dimethylformamide is titrated with the above solution until a viscosity of about 650 poises/30° C. is obtained. The solution contains 19.8% solids and the polymer has an inherent viscosity of 1.6 (in 0.5% solution in hexamethyl phosphoramide).

Films of this solution are prepared and submitted with controls to the action of Fade-Ometer and gas-fume tests as before. Table XI gives the results of these tests:

*Table XI*

| Film/additive/concentration | Percent yellowness | | |
|---|---|---|---|
| | As cast | After 16 hrs. fumes | After 16 hrs. U.V. |
| A. Regular polymer—no N-methyl diethanolamine, no additives | 7.1 | 13.9 | 10.6 |
| B. Regular polymer as (A) with DEAM: "Ti-Pure" R–610/5:5 | 2.9 | 8.7 | 4.7 |
| C. Polymer with N-methyl diethanolamine | 2.1 | 4.9 | 9.3 |

EXAMPLE XI 62.25 parts of dimer prepared in Example I are heated with 15.0 parts of methylene bis(4-phenyl isocyanate) at 80–85° C. for one hour. The capped dimer so obtained is cooled to room temperature and 105 parts of dimethylformamide are added. The solution is chilled to 0° C. and 6 parts of p,p'-methylenedianiline in 95 parts of dimethylformamide are added with stirring. The polymer solution so obtained is divided into 2 portions. To the first part are added 4½ parts of a 50% titanium dioxide ("Ti-Pure" R-610) slurry in dimethylformamide, 4.79 parts of DEAM, ½ part acetic acid and 5 parts dimethylformamide. The second portion of the polymer solution is retained as a control. The two solutions are spun as a five-filament yarn at 120° C. into a dry spinning column at 180° C. The yarn so produced is plied to 20 filaments and has a yarn denier of 60. The stabilized yarn contains 5½% titanium dioxide and 5¾% DEAM, based on the weight of polymer. The yarn samples are submitted as before to Fade-Ometer and fume tests. In the Fade-Ometer, the control sample is appreciably yellow in less than 4 hours, whereas the stabilized sample starts to yellow between 6 and 8 hours. In the fume test the unstabilized sample turns yellow in less than 6 hours whereas the stabilized sample begins to show slight color at 12 hours exposure.

In the above examples, the fiber stick temperature is that at which the fibers will just stick to a heated brass block when held against the surface of the block for 5 seconds with a 200 gm. weight.

In order for an amine to be useful in the stabilization of textile fibers, it is desirable that the amine should remain in the fibers throughout their useful life; that is, it should be non-volatile and washfast. For example, triethylamine does not aid in stabilization, presumably because it does not remain in the fiber during dry spinning, but departs with the solvent. On the other hand, N,N'-diisobutyl hexamethylene diamine is a satisfactory stabilizer until the fiber is washed. Thereafter it has no effect, presumably because it is washed out. For this reason macromolecular amines are preferred for use in the present invention. Examples are polyethylene imine, DEAM, DMAM, and urea-formaldehyde, already cited. It is possible for at least some part of the stabilizing amino groups to be present in the elastomeric macromolecules themselves. The polymer of Example X is a case in point. However, amine groups cannot be introduced indiscriminately into the polymeric molecule without detriment to the physical properties of the elastomer.

The stabilizing compositions may be added during the polymerization step, for example, before formation of the ureylene residues by extending the isocyanate-capped soft segments with hydrazine or a diamine. However, it is generally convenient to add the stabilizing substances to the polymer solution.

It is surprising that titanium dioxide, which is known to accelerate the degradation of nylon in ultraviolet light, and an amine such as DEAM, which itself tends to yellow in ultraviolet light, should prove effective as stabilizers for the ureylene-containing elastomers when treated in accordance with the present invention. That this degradation is due to degradation at the ureylene linkage itself rather than some other part of the elastomer molecule, is suggested by the following facts.

The polyester derived from 2,5-hexane diol and adipic acid, of molecular weight approximately 2000, is reacted with 2 moles of methylene bis(4-phenyl isocyanate). This macrointermediate is then condensed with an equimolar portion of ethylene diamine. Fibers prepared from this elastomer have a tenacity of 0.29 and an elongation of 429%. In a Fade-Ometer, the tenacity drops to ½ in 50 hours, but the elongation drops to ½ in only 8 hours and the fibers yellow badly. A polymer containing the same soft segment, but with a urethane-containing hard segment substituted for the ureylene-containing hard segment, may be prepared by converting the polyester to the bischloroformate and subsequently copolymerizing with 1,3-phenylene bischloroformate in a reaction with piperazine. The hard segment has the formula:

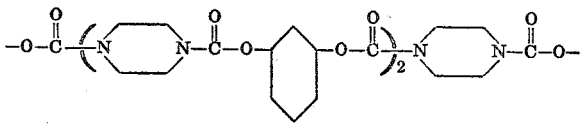

Fibers prepared from this elastomer have a tenacity of 0.22 grams per denier and an elongation of 682%. The Fade-Ometer half lives for these properties are 115 hours and 127 hours respectively. The resistance to yellowing is also substantially better than the elastomer with ureylene hard segment.

The same sort of comparison is evident if one turns to elastomers in which the soft segment is a low melting polyurethane rather than a polyester. Here again, polymers containing ureylene hard segments are found to be relatively light unstable when compared, for example, with polymers containing urethane hard segments.

The foregoing evidence indicates that in a polymer containing both the urethane and ureylene linkage, it is the aromatic ureylene portion of the elastomer molecule which is the more susceptible to degradation, and it is this portion of the molecule which is probably most affected by the stabilizing compositions of this invention.

Elastic fibers prepared from the stabilized composition of the present invention are useful either alone or in blends with hard fibers in the preparation of stretchy woven or non-woven fabrics. Because of their greatly improved light stability, they are especially advantageous for use in bathing suits and other outerwear.

It will be apparent that many widely different embodiments of this invention may be made without departing from the spirit and scope thereof, and therefore it is not intended to be limited except as indicated in the appended claims.

We claim:

1. A stabilized composition of matter comprising a synthetic segmented elastomeric polymer having a plurality of low-melting polymeric segments alternating in the polymer chain with high-melting ureylene-containing segments, the polymerica segment being the residue remaining after removal of the terminal hydroxyl groups from a hydroxyl-terminated polymer having a melting point below 60° C. and a second order transition temperature below room temperature, the ureylene-containing segment containing at least one group of the formula

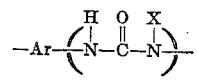

wherein Ar represents an aromatic radical attached to the

group of the formula through a carbon atom of an aromatic ring and X is selected from the group consisting of hydrogen and a monovalent organic radical, said segmented polymer having admixed therein between 1% and 15% by weight of an aliphatic amine having a molecular weight above about 280.

2. The composition of claim 1 wherein said hydroxyl-terminated polymer is a polyether and said aromatic radical is a methylene bis(phenyl) radical.

3. An elastic fiber of the composition of claim 1.

4. An elastic film of the composition of claim 1.

5. A stabilized composition of matter comprising a synthetic segmented elastomeric polymer having a plurality of low-melting polymeric segments alternating in the polymer chain with high-melting ureylene-containing segments, the polymeric segment being the residue remaining after removal of the terminal hydroxyl groups from a hydroxyl-terminated polymer having a melting point below 60° C. and a second order transition temperature below room temperature, the ureylene-containing segment containing at least one group of the formula

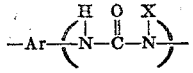

wherein Ar represents an aromatic radical attached to the

group of the formula through a carbon atom of an aromatic ring and X is selected from the group consisting of hydrogen and a monovalent organic radical, said segmented polymer having admixed therein between 1% and 15% by weight of titanium dioxide and between 1% and 15% by weight of an aliphatic amine having a molecular weight above about 280.

6. The composition of claim 5 wherein about 5% of said amine and about 5% of titanium dioxide are admixed with said segmented polymer, and said amine is poly-(N,N-diethyl-beta-aminoethyl methacrylate).

7. An elastic fiber of the composition of claim 5.

8. An elastic film of the composition of claim 5.

9. A stabilized composition of matter comprising a synthetic segmented elastomeric polymer having a plurality of low-melting polymeric segments alternating in the polymer chain with high-melting ureylene-containing segments, the polymeric segment being the residue remaining after removal of the terminal hydroxyl groups from a hydroxyl-terminated polymer having a melting point below 60° C. and a second order transition temperature below room temperature, the ureylene-containing segment containing at least one group of the formula

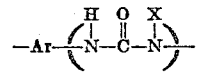

wherein Ar represents an aromatic radical attached to the

group of the formula through a carbon atom of an aromatic ring and X is selected from the group consisting of hydrogen and a monovalent organic radical, said segmented polymer having admixed therein between 1% and 15% by weight of a stabilizing agent selected from the group of aliphatic amines consisting of poly(N,N-diethyl-beta-amonoethyl methacrylate), poly(N,N-dimethyl-beta-aminoethyl methacrylate), polyethyleneimine, dihydroabietylamine, and urea formaldehyde.

10. An elastic fiber of the composition of claim 9.

11. A stabilized composition of matter comprising a synthetic segmented elastomeric polymer having a plurality of low-melting polymeric segments alternating in the polymer chain with high-melting ureylene-containing segments, the polymeric segment being the residue remaining after removal of the terminal hydroxyl groups from a hydroxyl-terminated polymer having a melting point below 60° C. and a second order transition temperature below room temperature, the ureylene-containing segment containing at least one group of the formula

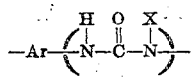

wherein Ar represents an aromatic radical attached to the

group of the formula through a carbon atom of an aromatic ring and X is selected from the group consisting of hydrogen and a monovalent organic radical, said segmented polymer having admixed therein between 1% and 15% by weight of poly(N,N-diethyl-beta-aminoethyl methacrylate).

12. The composition of claim 5 wherein said titanium dioxide is in the rutile form.

13. An elastic fiber of the composition of claim 11.

14. The process of stabilizing synthetic segmented elastomer polymers having a plurality of low-melting polymeric segments alternating in the polymer chain with high-melting ureylene-containing segments, said polymeric segments being the residues remaining after removal of the terminal hydroxyl groups from a hydroxyl-terminated polymer having a melting point below 60° C. and a second order transition temperature below room temperature, said ureylene-containing segments containing at least one group of the formula

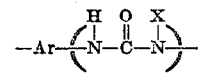

wherein Ar represents an aromatic radical attached to the

group of the formula through a carbon atom of an aromatic ring and X is selected from the group consisting of hydrogen and a monovalent organic radical, which comprises preparing a solution of said polymer in an inert organic solvent and thereafter adding to the solution of said polymer between 1% and 15% by weight of said polymer of titanium dioxide and between 1% and 15% by weight of said polymer of an aliphatic amine having a molecular weight above about 280.

References Cited in the file of this patent

FOREIGN PATENTS

| | | |
|---|---|---|
| 11,946 | Germany | June 21, 1956 |
| 538,977 | Canada | Apr. 2, 1957 |